UNITED STATES PATENT OFFICE.

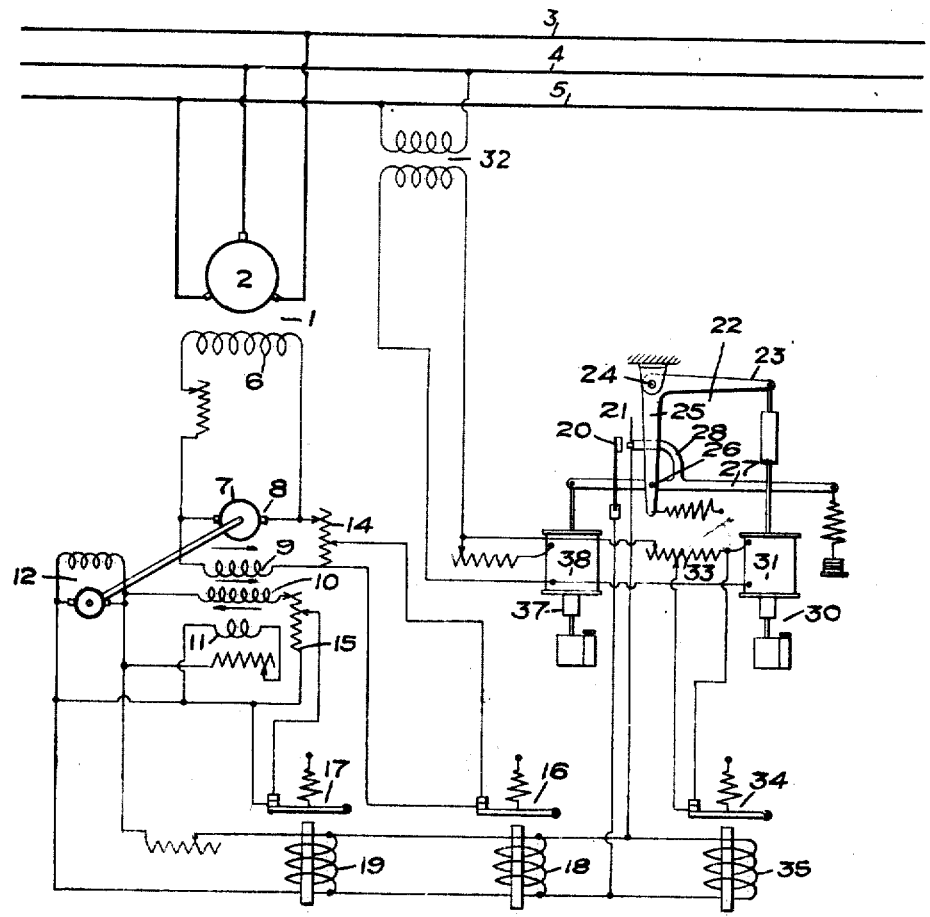

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATING SYSTEM.

1,284,574.   Specification of Letters Patent.   Patented Nov. 12, 1918.

Application filed April 12, 1916, Serial No. 90,670. Renewed October 7, 1918. Serial No. 257,273.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Electrical Regulating Systems, of which the following is a specification.

My invention relates to voltage and similar regulators for dynamo-electric machines and particularly to regulators of the vibrating contact type that are adapted to automatically control the effective field strengths of dynamo-electric machines.

The object of my invention is to provide a quickly and accurately responsive regulator having a broad range of regulation; viz, a range that is not limited by the residual magnetism of the dynamo-electric machine.

It is frequently desirable that a regulator shall cause the voltage of an exciter for a generator or other dynamo-electric machine to vary from a comparatively high value to substantially zero, and especially when the regulator is employed in connection with a synchronous condenser. However, this has not always been feasible because the residual magnetism in the field of the exciter has prevented the voltage from decreasing to a sufficiently low value.

According to the present invention means are provided for overcoming the effect of residual magnetism, with the result that the regulator responds quickly and accurately to variations in the quantity regulated, and the regulator has a broad range of operation.

In the single figure of the accompanying drawing, which diagrammatically illustrates an electrical system embodying my invention, a synchronous condenser 1, or other suitable dynamo-electric machine, has its armature 2 connected to a transmission-circuit 3—4—5 and its field-magnet winding 6 connected to the armature 7 of an exciter 8. The exciter 8 is provided with a main field-magnet winding 9 that supplies the greater portion of the energy for field excitation and is here shown as connected in shunt to the exciter armature 7, though it may receive energy from any other suitable source. The exciter is also provided with two opposing field-magnet windings 10 and 11 that receive exciting current from a small generator 12, or that may receive it from any other suitable source, such as a storage battery. The winding 10 comprises more convolutions than the winding 11 or is otherwise arranged to produce a larger amount of field flux than the winding 11.

In series with the main field winding 9 and the auxiliary field winding 11 are resistors 14 and 15, respectively, the effective values of which are governed simultaneously by relays 16 and 17, respectively. The relays 16 and 17 are provided with energizing windings 18 and 19 that receive current from the generator 12 or from any other suitable source. The windings 18 and 19 are caused to be energized and deënergized by the disengagement and engagement of a pair of stationary and movable contact members 20 and 21 that constitute parts of the main control element of a regulator 22.

The regulator comprises also a bell-crank lever 23 having a stationary fulcrum at 24 and a depending arm 25. The arm 25 carries, and provides a fulcrum at 26 for, a second lever 27 having an upwardly and laterally extending arm 28 upon which the movable contact member 21 is mounted. The arm 23 is actuated by an electromagnet 30 having a winding 31 that receives exciting current from the circuit 3, 4 and 5 through a transformer 32. In series with the winding 31 is a resistor 33 having the contact members of a relay 34 connected in shunt to a portion thereof. The relay 34 is provided with an actuating winding 35 that is controlled, similarly to the windings 18 and 19, by means of the contact terminals 20 and 21. The engagement and disengagement of the contact terminals of the relay 34 causes the current in the winding 31 to vary in amount, thereby, in turn, causing the contact terminal 21 to move into and out of engagement with the terminal 20. The lever 27 is actuated by electromagnet 37 having an energizing winding 38 that receives current proportional to the voltage of the circuit 3—4—5, if the regulation is to be affected in accordance with variations of the said voltage. However, if desired, the lever 27 may be actuated in accordance with variations of other electrical quantities pertaining to the circuit 3—4—5, such as the current or power factor.

In the operation of the regulator, the position of the contact terminal 21 is varied by electromagnet 37 in accordance with the voltage or other selected electrical condition of the circuit 3—4—5, and the electromagnet 30 serves to cause engagement and disengagement of the terminal 21 with the terminal 20. When the terminals 20 and 21 engage each other, the contact terminals of the relays 16 and 17 also engage each other, and the resistors 14 and 15 are accordingly short circuited. As a result, the exciter field windings 9 and 10 have full voltage applied to them and there is a tendency of the exciter to increase its voltage to its maximum value. When the contact terminals 20 and 21 are not in engagement the contact terminals of the relays 16 and 17 are also disengaged, with the result that the resistors 14 and 15 are included in circuit with the exciter field windings 9 and 10. Under this condition, the field windings 9 and 10 have the minimum voltages applied to them and there is a corresponding decrease in the exciter voltage. The values of the resistors 14 and 15 are such that, when they are included in circuit with field windings 9 and 10 for a sufficient period, the auxiliary field winding 11 may force the exciter voltage to substantially zero, or may even cause the current in the exciter to reverse its direction of flow. The winding 11, therefore, serves to cause a more rapid decrease in the exciter voltage and also forces it below a value corresponding to that which would be produced by the residual magnetism in the exciter field structure. This result is, of course, rendered possible by the fact that the auxiliary field windings 10 and 11 receive current from a source independent of the exciter. The increase in the voltage of the exciter, when the resistors 14 and 15 are short-circuited, is also more rapid than would otherwise be the case because of the fact that the field winding 10 assists the main field winding 9 and is excited from an independent source.

I claim as my invention:

1. The combination with a dynamo-electric machine having a main field-magnet winding and two mutually opposing auxiliary field-magnet windings, of a regulator for the dynamo-electric machine comprising means for simultaneously varying the excitation of the main field-magnet winding and of the auxiliary field-magnet winding that is supplementary thereto.

2. The combination with a dynamo-electric machine having a main field-magnet winding and two mutually opposing auxiliary field-magnet windings, of a regulator for the dynamo-electric machine comprising means for similarly and simultaneously varying the excitation of the main field-magnet winding and one of the auxiliary field-magnet windings.

3. The combination with a dynamo-electric machine having a main field-magnet winding and two opposing auxiliary field-magnet windings one of which, when fully energized, preponderates over the other, of a regulator for the dynamo-electric machine comprising means for simultaneously varying the excitation of the main field-magnet winding and the preponderating auxiliary field-magnet winding.

4. The combination with a dynamo-electric machine having a main field-magnet winding and two opposing auxiliary field-magnet windings one of which, when fully energized, preponderates over the other, and resistors respectively in circuit with the main and the preponderating auxiliary field-magnet windings, of a regulator for the dynamo-electric machine comprising means for simultaneously varying the effective values of the resistors.

5. The combination with a dynamo-electric machine having a main field-magnet winding and two mutually opposing auxiliary field-magnet windings, and resistors respectively in circuit with the main field magnet winding and with the auxiliary field-magnet winding that is supplementary thereto, of a regulator for the dynamo-electric machine comprising means for simultaneously varying the effective values of the resistors.

6. The combination with a dynamo-electric machine having a main field-magnet winding and two auxiliary field-magnet windings, and a constant source of energy for supplying the auxiliary field-magnet windings, of a regulator for the dynamo-electric machine comprising means for simultaneously varying the excitation of the main field-magnet winding and one of the auxiliary field-magnet windings.

7. The combination with a dynamo-electric machine having a main field-magnet winding and two mutually opposing auxiliary field-magnet windings, and a constant source of energy for supplying the auxiliary field-magnet windings, of a regulator for the dynamo-electric machine comprising means for simultaneously varying the excitation of the main field-magnet winding and one of the auxiliary field-magnet windings.

In testimony whereof, I have hereunto subscribed my name this 31st day of March 1916.

CLARENCE A. BODDIE.